United States Patent [19]

Levine

[11] Patent Number: 4,843,426
[45] Date of Patent: Jun. 27, 1989

[54] SPECIAL EFFECTS PHOTOCOPIER

[76] Inventor: Alfred B. Levine, 2924 Terrace Dr., Chevy Chase, Md. 20815

[21] Appl. No.: 108,644

[22] Filed: Oct. 15, 1987

[51] Int. Cl.⁴ .................... G03G 15/01; G03G 21/00
[52] U.S. Cl. ........................... 355/202; 346/157; 355/22; 355/32; 355/133; 355/244; 355/218; 355/328
[58] Field of Search ............. 354/3, 5; 346/153.1, 346/157; 358/300; 355/3 R, 4, 7, 22, 46, 133, 32

[56] References Cited

U.S. PATENT DOCUMENTS

| 3,563,637 | 2/1971 | Ferguson | 355/46 X |
| 4,150,991 | 4/1979 | Dillow | 355/46 X |
| 4,236,809 | 12/1980 | Kermisch | 355/4 |
| 4,251,153 | 2/1981 | Levine | 355/3 R |
| 4,588,282 | 5/1986 | Levine | 355/3 R |
| 4,660,961 | 4/1987 | Kuramoto et al. | 355/4 |
| 4,687,316 | 8/1987 | Dering | 355/3 R |

FOREIGN PATENT DOCUMENTS

| 60-107049 | 6/1985 | Japan | 355/4 |
| 60-218674 | 11/1985 | Japan | 355/4 |

Primary Examiner—Fred L. Braun

[57] ABSTRACT

A photocopier for reproducing an image of an object together with a "special effect" image that is related to the image. In one embodiment, the "special effect" image is the same entire image, or a modified portion, that is reproduced at an adjacent position and in a different color, or in otherwise different visual form. In another embodiment, the "special effect" image is a fixed geometric figure, or portion, such as a line, circle, box, or other shape, also in different color or visual form. In still another a dual version of the image is reproduced to be viewed as a three dimensional configuration. In a still further variation, a portable video camera is used as a reader to obtain dual views of the object to be reproduced, to present a three dimensional reproduction by the photocopier.

24 Claims, 2 Drawing Sheets

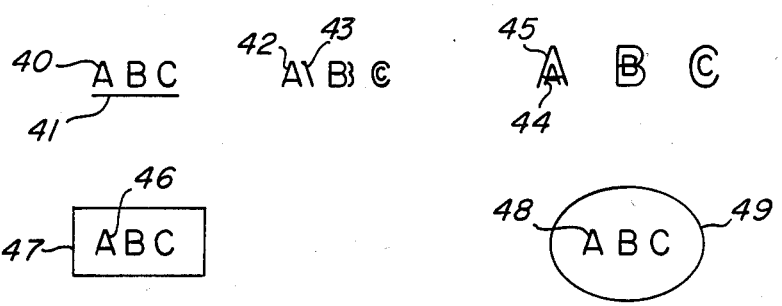
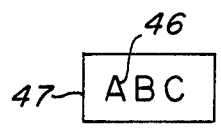
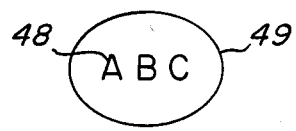
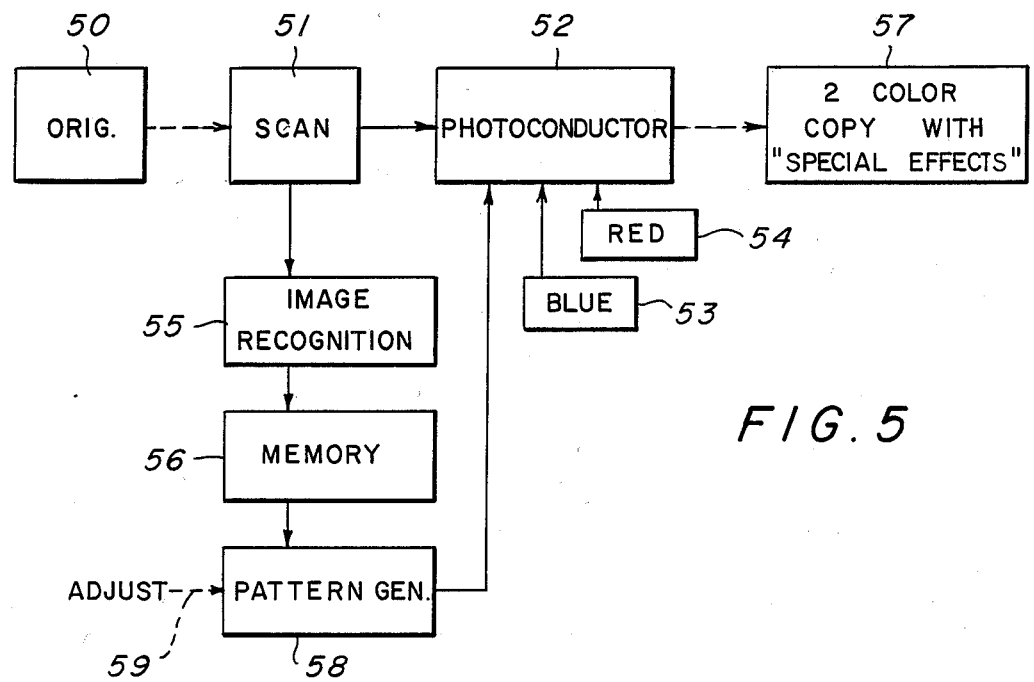
FIG. 5
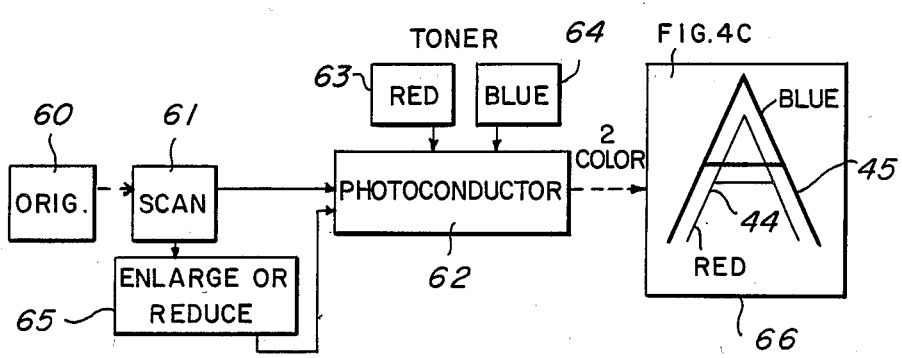
FIG. 6

SPECIAL EFFECTS PHOTOCOPIER

STATEMENT OF THE INVENTION

This invention generally relates to improvements in photocopiers and photocopier systems, and more particularly to photocopiers for reproducing copies of original documents and objects and printing additional "special effect" images on the same copy sheet to modify the reproduced copy.

BACKGROUN AND PRIOR ART

Although xerographic, magnetic, and other dry photocopying techniques are comparatively recent developments, such photocopiers have rapidly proliferated on the open market to such extent as to now be commonly found in most offices and many homes. In addition to reading and printing reproductions of documents, such machines now provide many additional functions including rapid sheet feeding, automatic duplexing, sorting and collating the copies, editing of the copies, and a number of others. Multicolor photocopiers are now also widely available that reproduce multicolored originals with colors closely approximating the natural colors of the originals. Other photocopiers are available that have the capability of reproducing an original document that is printed in one color in anyone of a series of different colors that may be selected by a user. Still other machines are available that can combine images, or portions, from different originals and print the combined image on the same copy sheet; print different portions of an image in different colors; and perform still other functions.

SUMMARY OF THE INVENTION

Accordingly to the present invention there is provided a photocopier that reads and reproduces an orginal document or object, and additionally prints other "special effect" images on the same copy sheet, using the same or different colors than are used in the reproduced original.

The "special effect" images may be a duplicate reproduction of the same image, or portions thereof, as in the original document, and may be printed either in the same or in a different color, and may be printed in the same or in a displaced or angled location than the reproduced copy. These "special effect" images may also be enlarged in size, or reduced, or otherwise modified, before being printed on the copy sheet along with the reproduced original.

Where it is desired to provide a copy that may be viewed as being in three dimensions from a two dimensioned original, the "special effect" image is the same as the copy of the original but in a different color and printed at a different, displaced position on the copy sheet. Alternatively, the "special effect" photocopier of the present invention may receive two different images of the same object to be copied, and print a combined copy of the two images, in different colors, showing the object on the copy sheet in a form that may be viewed in three dimensions.

The "special effect" image being printed in addition to the original reproduction, may also be used to outline, edge, underline, encircle, or otherwise enhance the printing of alpha-numeric characters of the reproduced original, using the same or different colors. All of these and other functions can be performed using image recognition circuitry, various sensors, digital memories, and other available components as will be disclosed in greater detail hereafter.

DESCRIPTION OF THE DRAWINGS

FIGS. 4i a, 4b, 4c, 4d, and 4e, show reproductions of an image "ABC" with an added "special effect" printing according to the invention, FIG. 5 is an electro-mechanical block diagram showing a two color photocopier for reproducing the images with "special effects" shown in FIGS. 4a, 4b, 4d, and 4e, and FIG. 6 is an electro-mechanical block diagram showing a two color photocopier for reproducing the image with "special effects" shown in FIG. 4c.

DETAILED DESCRIPTION OF PREFERRED EMBODIMENTS

Figure 1:
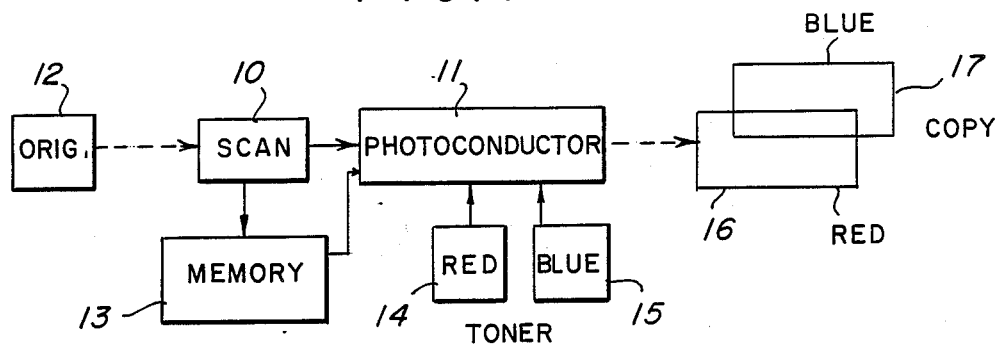
FIG. 1 is an electro-mechanical block diagram of a photocopier for reproducing an image in a form viewable in three dimensions.

Referring to the drawings there is shown in FIG. 1, a two color photocopier according to the invention for reading an original document and making a two image copy thereof, at 16 and 17, on the same copy sheet, that is viewable by a user as being in three dimension form.

As shown, the original document 12 or object is scanned by the reader 10 and a latent image thereof is formed on the photoconductor 11. This latent image is toned by a red toner 14, and the visably developed red copy of the image is transferred to a copy sheet and printed as a red image 16, as shown. The scanned image is also applied by the reader or scanner 10 to a transducer and memory 13 where the same image of the original is stored. After the red copy of the image has been printed, the same image is read out from the memory 13, applied to the photoconductor 11, at a different position, toned by 15 in a blue color and transferred to the same copy sheet to be printed in the color blue as copy 17. Thus there is printed on the same copy sheet two reproductions 16 and 17 of the same image as the original 12, with one reproduction 16 being in the color red and the second reproduction being in the color blue, and with the blue copy being printed at a different position on the paper than the red copy, as shown.

In the same manner as when viewing any two color three dimensional image (3-D), a user is supplied with a dual color eyeglass, or other viewing device, having a different color lens for viewing by each eye (not shown). In the present embodiment, the lens covering one eye is blue filter and that covering the other eye is a red filter. The blue filter enable one eye to see only the red image whereas the red filter enables the other eye to see only the printed blue image 17. Since the two printed images 16 and 17 are also physically separated apart on the copy sheet, the user sees what appears to be single image in three dimensional form.

It will be appreciated by those skilled in the art that many variations may be made in the apparatus of FIG. 1 to achieve the same end result of providing two spaced apart images on the same sheet, with each image being viewable only by a different eye of the viewer.

For example, the photocopier can be modified to scan the original document 12 twice in succession, and successively develop the two images in different colors, and successively transfer the two images to the same copy sheet at different locations. As another alternative, each of the two scanned images may be applied to the photoconductor 11 with different polarizations (eg. horizontal and vertical or clockwise- circular and counterclockwise- circular) and toned in the same color toner, and with the two differently polarized images being printed in different positions on the copy sheet. In this event, the user is supplied with glasses or a viewer having differently polarized lenses for each eye, corresponding to the two differently polarized printed images on the copy sheet. In the same manner as previously described each eye sees only one of the two displaced images, resulting in the viewer seeing the image on the printed copy as being in three dimensions.

Various different kinds of photocopiers may also be used in practising the invention including electrostatic, magnetic, ion types, and other including laser printers and laser photocopiers. In each different type, the original document is read or scanned, once or twice as earlier described, and an image thereof is applied to a sensitive medium where it is developed, toned, and/or otherwise printed in two colors, or different polarizations, and at different locations on the same copy sheet. The shifting apart or displacement of the two copied images on the copy sheet may be performed by changing the position (degree of rotation etc.) of the photoconductor or other medium, between the first and second scans of the original document 12. Alternatively, the copy sheet may be moved after the first printed reproduction of the image is made, so that the second printed reproduction of the image is made at a different position on the copy sheet.

It will be appreciated that the dual color image 16 and 17 in FIG. 1 is not a true three dimensional copy of the original but a quasi 3-D copy that appears to the viewer to be in three dimensions.

Figure 2:
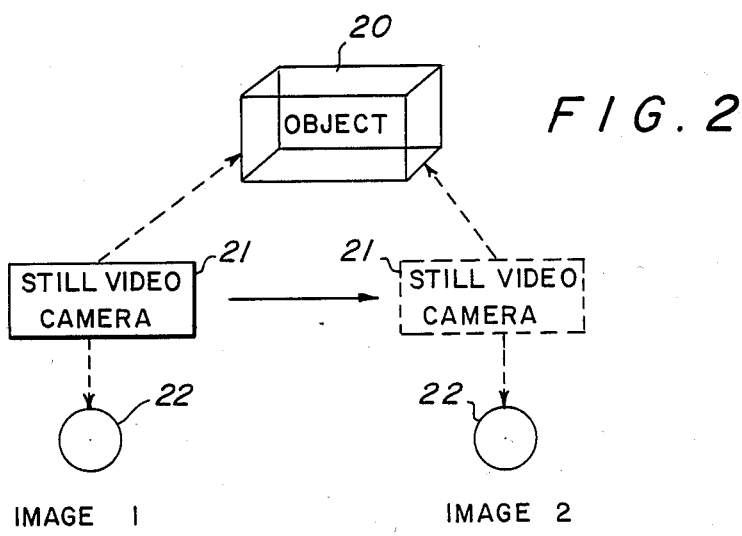
FIG. 2 is a schematic illustration of an electronic video camera for imaging an object for later viewing in three dimensions.
Figure 3:
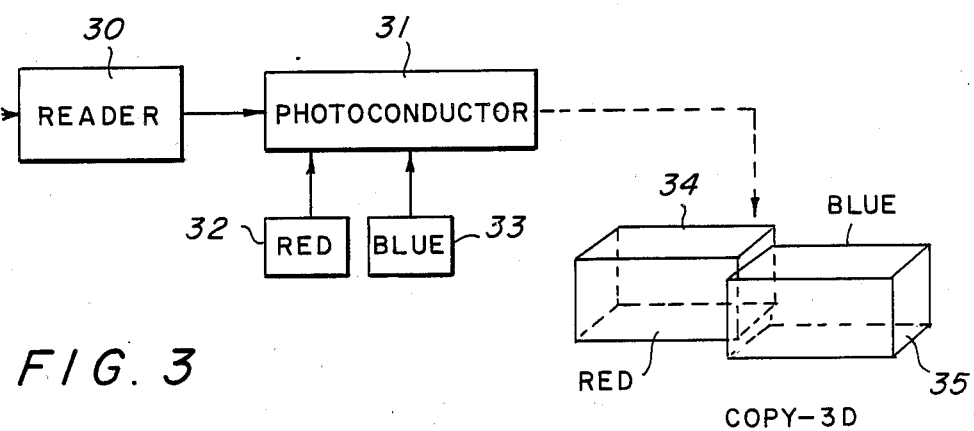
FIG. 3 is an electro-mechanical illustration of a photocopier for reproducing a three dimensional image from the two video camera recordings of FIG. 2.

FIG. 2 and FIG. 3, on the other hand, show a similar apparatus for photocopying a true three dimensional copy of an original object 20. As shown in FIG. 2, an electronic video camera 21 is used to observe and record a first image of the object 20 on a magnetic disc 22 within the portable camera 21. The video camera is then moved to the right, as shown, to a different vantage point with respect to the object 20 and the video camera images and records a second image of the object 20 on magnetic disc 22 from this second vantage position.

A three dimensional reproduction or copy 34, 35 of object 20 is made by the photocopier in FIG. 3, using the two recorded images of the object 20 taken by the video camera in FIG. 2. As shown, the first recorded image on magnetic disc 22 is read by reader 30 or a scanner and applied to the photoconductor 31 to form a latent image thereon. This first latent image is visibly developed in one color, eg red, using the red toner 32, and is transferred to a copy sheet, thereby printing the first red reproduction 34. The second image on the magnetic disc 22 is then read by the reader 30 and applied to the photoconductor 31 at a position on the photoconductor 31 that is displaced from the position of the first applied image. This second latent image is toned in a different color, eg blue, by the blue toner 33, to visibly develop the second image, and the second image is transferred to the copy sheet and printed at a displaced position 35 from the first image 34. Thus the first and second images recorded by the video camera 22 are printed on the same copy sheet in different colors 34 and 35, respectively, and are printed at displaced positions on this same sheet. When viewed through the same type of two color lenses of the eyeglasses as described above, a viewer sees a three dimensional picture of the object 20.

As briefly mentioned above different types of photocopiers may be used in practising the embodiment of FIGS. 2 and 3. As a further alternative, the two printed images 34 and 35 may be printed with different optical polarizations instead of being printed in different colors. For example, using a laser photocopier, the first image may be read by reader 30 and used to modulate a laser beam that writes this image on the photoconductor 31 using a clockwise polarization scanning movement. This results in recording of this first image 35 on the copy sheet with this clockwise mode of polarization. The second image on the magnetic disc is later read by the photocopier and applied to the photoconductor 31 with a counterclockwise direction of polarization, and at a displaced position 35 on the same copy sheet. These two differently polarized visual images are viewed using glasses having differently polarized lenses for each eye, whereby a viewer observes only one of the displaced images 34 or 35 with one eye and sees only the remaining one of the images 34 or 35 through the other eye. Since the two displaced images 34 and 35 were initially recorded by the video camera 21 from different positions or vantage locations, the viewer sees the image of the object in stereo or three dimensional form.

FIGS. 4, 5, and 6 show alternative embodiments of the present invention to provide other kinds of "special effect" images on the printed copy sheet made by the photocopier.

As shown in FIGS. 4a, 4d, and 4e, the photocopier reproduces the original document or object in one color or style on the copy sheet. Then as a "special effect", the photocopier prints a fixed pattern or geometric shape in a different color, alongside the reproduction of the original, to emphasize or modify the printed reproduction. For example, in FIG. 4a the original image reproduced by the photocopier is the image of the letters "ABC", and this image is reproduced on the copy sheet in one color, such as red 40. For a "special effect", the photocopier then prints a line 41, underlining the image 40, but in a different color, such as yellow.

Similarly, in FIG. 4d, the same original image 46 of the letters "ABC" is read by the photocopier and reproduced in one color, such as the color brown. However, in this embodiment a different "special effect" image is printed at 47, in the form of a rectangle or box 47 enclosing the reproduced image 46 in a different color, such as the color green. In FIG. 4e, the results is similar, but the reproduced image 48, printed in one color, eg. pink, is enclosed within a printed circle 49, that is printed as a "special effect" by the photocopier in a different color than the reproduced image, such as in the color violet.

Thus in all three embodiments of FIGS. 4a, 4d, and 4e, the photocopier reproduces the original image in one color, and then prints lines, geometric figures, or other predetermined marking, in a different color, in a fixed relationship to the reproduced image.

FIG. 5 illustrates one preferred photocopier for performing the "special effects" printing functions described above in connection with FIGS. 4a, 4d, and 4e. As shown, the original object or document 50 is scanned or read at 51 by the photocopier and a latent image thereof is formed on the photoconductor 52. In conventional fashion, this latent image is developed by toner 53 in the color red, or other color, and transferred to the copy sheet 57 and printed thereon. The original document 50 is then scanned again by reader 51, and its output applied to image recognition circuit 55, when given characteristics of the original image are recognized, and the results entered into memory 56. Among others, such recognized characteristics can include any of the edges, base, top, sides, or other features of alphanumeric characters; or the beginning or ending of paragraphs, lines, margins of printing; or the spacing or other items of format of the original image 50. A user selects a characteristic of the original image that is of interest, eg the base of the printed characters, and this selected characteristic is entered into the memory 56. These recognized characteristics in the memory 56 are read out and used to control a pattern generator 58, that applies an image of the fixed pattern to the photoconductor 52 (eg. underlining, boxing, encircling etc.). The "special effect" pattern is visibly developed in a different color, eg in the color blue, by the toner 53, and this blue image of the "special effect" is transferred to the copy sheet 57 and printed thereon.

Image recognition circuits 55 that respond to optically scanned images for detecting various characteristics of such images are well known in the art, and are available as circuit components on the open market. A more detailed description of such circuits are therefore not considered to be necessary in the present application. Many patents have also issued covering various of such circuits, and reference is made herein to a few of such patents. For example, the Clapper U.S. Pat. No. 3,297, 993 discloses a circuit for detecting edges and boundries of an image. The more recent patent of Belt et al U.S. Pat. No. 4,553,260 also recognizes edges and other characteristics of an image, as does Bassetti et al U.S. Pat. No. 4,544,264.

As a further alternative, to the printing of fixed patterns, lines, or other fixed configurations, it may be desired to reproduce and print as a "special effect" image, a second image of the entire original image, or a portion thereof, on the same copy sheet, as is shown in FIGS. 4b and 4c.

In FIG. 4b, the original image 42, also using as an example the letters "ABC", is reproduced and printed in one color, such as yellow, on the copy sheet as shown. An additional "special effect" image 43 is generated as a portion of the same image, and is printed on the same copy sheet, in a displaced position, and in a different color such as magenta. As shown, this added "special effect"image is a reproduction of the right hand side, or outer configuration, of each of the letters in the original image 42.

For producing the "special effect" printing shown in FIG. 4b, the same circuit in FIG. 5 may be used, in the same manner as discussed above. The original image 50 is scanned at 51, applied to photoconductor 52, toned in one color, transferred to copy sheet 57 and printed. The scanned image from scanner 51 is also applied to the image recognition circuit 55, where the right hand sides and edges of each of the chartacters 42 are detected and entered into the memory 56. The pattern generator 58 reponds to readout of the memory 56, to reproduce this right hand side portion of each charcter on the photoconductor 52 as a latent "special effect" image, and at a position displaced to the right of the initial image. This secondary "special effect" image is toned in a different color, by one of the toners 53 or 54, to visibly develop the secondary image, and the secondary image is transferred to the copy sheet 57 and printed alongside the reproduced original imge.

Where it is desired that this secondary "special effect" image be a second reproduction of the entire original image but be printed in different form, different size, and in different color, this is performed using the modified circuit shown in FIG. 6, to obtain a different "special effect" reproduction, as is depicted in FIG. 4c.

As shown in FIG. 4c, the original image, that in this example also uses the letters "ABC" 44 is read and reproduced from the original 60 (FIG. 6), in the same manner as previously described. The original 60 is then scanned again at 61, where it is optically enlarged or reduced, as indicated at 65. The first image of the original 60 is applied to photoconductor 62, toned in one color (eg blue) by toner 64, transferred to copy sheet 66 and printed out in the color blue. Subsequently, the enlarged (or reduced image, as selected) is then applied to the photoconductor 62, toned in the same color or in a different color, such as red by toner 63, transferred to the copy sheet 66 and printed in red (or other selected color) on 45 on top of the original reproduction 44, thereby to provided a dual image of each character in the original image, with the secondary printing of each character being of different size, and in the same or different color than the first printed image on the same copy sheet.

Many presently available photocopiers are provided with controls for selecting the size or scale of the printed reproduction with respect to the size of the original. Many multicolor photocopiers are also provided with controls for selecting the color of the reproduction. In the embodiment of FIG. 6, these two types of controls are combined with control of the paper feed, to enable both printed images to be applied on the same side of one copy sheet.

Where a laser type of photocopier is employed, the special effect secondary image may also be of a different font style than the reproduction of the original. Since the image is applied to the photoconductor by a scanning laser beam, such laser photocopies often enable the user to select different font styles to print out a reproduction in a different style than the original document. According to the present invention, this capability may be employed to enable the original to be printed out in one style and in one selected color, and then enable the copier to print out, on the same copy sheet, a special effect image in a different font style, and in the same or in a different color than the first reproduction of the original. The secondary or "special effect" image may be a copy of the entire original image, or only be a protion thereof, as in FIG. 4b.

Briefly recapitulating the operations as described above, the photocopier of the present invention reads and reproduces an image of an original document or object, and prints the image on a copy sheet in a selected color. The same image, or a portion of the image, is reproduced as a "special effect" image or secondary image and is printed on the same copy sheet as the reproduced original, and at a given location and orientation with respect to the reproduced original. This "special effect" image may be printed in the same or in a different color than the reproduced original, and may be an enlarged or reproduced virsion of the original, and may use the same or a different font or style of characters than the reproduced original. The characters in the original image may be underlined, highlighted, enclosed within a circle or box, or other type of secondary image added as an overlay, or at a displaced position, on the same copy sheet. This secondary "special effects" image may be printed in the same color as the original, or in a different color or different tone of the same color, for highlighting, emphasis, or other purpose. In a similar manner, other portions of the original document or object may be reconginzed, including margins, top of sheet, bottom of sheet, paragraphing, spacing, and other matters of format; and such other portions may be highlighted in the same or different color or shading, or otherwise printed with a "special effect" marking.

The original image may be reproduced in a form than can be viewed in stereo or in three dimensions, by reproducing two copies of the original in a spaced apart position on the same copy sheet. Each of the two reproductions being visually distinguishable from the other, by different color, different ploarization or the like, so as to be separately viewed by the two eyes of a viewer using differently colored lenses or differently polarized lenses. Alternatively, two different images of an original can be recorded at different vantage positions using a protable video camera, and the two recordings can be reproduced by the photocopier on the same copy sheet in spaced apart relationship, in different color or ploarization, for stero viewing.

The added "special effect" or secondary images may also be other alpha-numeric or garaphic data or information, generated within the photocopier, or produced externally, and reproduced on the same copy sheet as the original, and in the same or different color or shading.

Since these and many other changes and variations may be made by those skilled in the art without departing from the spirit and scope of this invention, this invention is to be considered as being limited only by the following claims.

I claim:

1. A photocopier for reproducing an image of an object with special effects comprising:
   an optical reader for reading an image of an object,
   a photosensor medium exposed to the image of the object by the reader to form a first latent image on the medium,
   generator means for generating a portion of the same image that is read by the reader and exposing the photosensor to said image portion to form a second latent image on the medium in a predetermined spatial relationship to the first latent image,
   and means for developing said first and second latent images with different visually distinguishable characteristics,
   said means for generating said second latent image comprising means for analyzing the image being read by the reader and selecting a portion of said image.

2. In the photocopier of claim 1,
   said portion of the image being selected comprising an outer edge of a character in the image,
   and said portion of the image being applied to said photocopier at a position adjacent that of the same character in the image.

3. In the photocopier of claim 1,
   said portion of the image being selected comprising an outer edge of a graphical object in the image,
   and said portion of the image being applied to the photosensor at a position adjacent that of the same graphic object in the image.

4. A photocopier for reproducing an image with added special effects comprising:
   an image reader for reading an image of an object to be reproduced,
   a photosensor medium exposed to the image from the reader to form a first latent image on the medium,
   generator means for forming a second latent image on the medium having a predetermined geometric configuration,
   and means for developing said first and second images to form corresponding visual images thereof with different visually distinguishable characteristics,
   said generator means including image recognition circuit means responsive to said reader for generating said second latent image comprising portions of characters in said first mentioned image,
   and said developing means developing a visible copy of said second latent image in a different color than the visible copy of said first latent image.

5. A special effects photocopier comprising:
   an optical scanner for reading an image of an object to be copied,
   a photosensor medium exposed to the scanner for forming a first latent image of the object on the medium,
   generator means for forming a second latent image on the photosensor having a predertermined geometric configuration at a position adjacent the first latent image,
   and developing means for developing said first and second latent images with different visually distinguishable characteristics,
   said generator means including image recognition circuit means responsive to said scanner for generating said second latent image comprising an outline of individual characters in said first mentioned image,
   and said developing means developing a visable copy of said second image in a different color than that of the first visible image.

6. A photocopier for reproducing an image of an object with special effects comprising:
   an optical reader for reading an image of an object,
   a photosensor medium exposed to the image of the object by the reader to form a first latent image on the medium,
   generator means for generating a portion of the same image that is read by the reader and exposing the photosensor to said image portion to form a second latent image on the medium in a predetermined spatial relationship to the first latent image,
   and means for developing said first and second latent images with different visually distinguishable characteristics,
   said second visible image comprising an edge portion of said first mentioned visible image and being applied by said generator means to said photosensor closely adjacent to the corresponding portion of the first mentioned image, thereby to highlight that edge of the first mentioned image.

7. A photocopier for reproducing an image of an object with special effects comprising:
   an optical reader for reading an image of an object, a photosensor medium exposed to the image of the object by the reader to form a first latent image on the medium, generator means for generating a portion of the same image that is read by the reader and exposing the photosensor to said image portion to form a second latent image on the medium in a predetermined spatial relationship to the first latent image, and means for developing said first and second latent images with different visually distinguishable characteristics, said second image being one of an enlarged or reduced portion of said first mentioned image and being applied in superimposed relationship over the corresponding portion of the first mentioned image.

8. A photocopier for reproducing an image with added special effects comprising:

an image reader means for reading and generating an image of an object to be reproduced, a photosensor medium exposed to the generated image from the reader means to form a first latent image on the photosensor, a special effects generator means for generating a different image having a predetermined configuration in the form of a fixed geometric pattern, image recognition means responsive to the image of the object for applying said special effect image to the photosensor in proportion to the dimensions of the image and adjacent to the image, and means for developing said image and special effect image to form corresponding visual images thereof with different visually distinguishable characteristics.

9. In the photocopier of claim 8, said special effect image being an endless geometric figure and being applied to the photosensor to enclose a portion of the image.

10. In the photocopier of claim 8, said special effect image being one of a line or endless geometric figure, and said image recognition means being responsive to the image of the object for applying the special effect image to the photosensor in a given spatial relationship to the latent image of the object.

11. In the photocopier of claim 8, said special effects generator means producing an image in the form of a line or fixed geometric figure, and said image recognition means responsive to characters and graphical symbols in the image of the object to apply said special effect image in a given displaced spatial relationship with respect to said characters and graphic symbols.

12. In the photocopier of claim 8, said special effects image being in the form of an endless geometric figure and being dimensioned to enclose portions of the image of the object.

13. In the photocopier of claim 8, said special effects image comprising a line to underling portions of the image of the object.

14. In the photocopier of claim 8, said special effect image being in the form of an endless hollow geometric figure, including a circle and rectangle, and being applied to enclose a character of the image of the object.

15. In the photocopier of claim 8, said special effects image being a straight line to underline a character in the image of the object.

16. A special effects photocopier comprising:

an optical reader means for reading and generating an image of an object to be copied, a photosensor medium exposed to the image being generated by the reader means to form a latent image on the photosensor, special effects generating means for generating a special effects image that is related to but differs from the latent image of the object, said special effects generating means including image recognition means responsive to the image of the object to generate said special effects image comprising on e of:

(a) a fixed geometric pattern,
(b) a reproduction of the same image,
(c) a reproduction of the same image but in a different degree of enlargement,
(d) a reproduction of portions of the same image but less than the entire image, means for applying the special effects image to the photosensor at a position displaced from but related to the latent image to provide a special effects latent image, and means for developing the latent image and special effects latent image with different visually distinguishable characteristics.

17. In the special effects photocopier of claim 11, said special effects generator producing a fixed geometric pattern in the form of one of a rectilinear line to underling a portion of the image or a closed endless geometric figure to enclose a portion of the image.

18. In the special effects photocopier of claim 16, said special effects generator generating the same image as that of the object to be copied but in a different degree of enlargement, and said special effect image being applied to the photosensor in superimposed relationship to the image of the object.

19. In the special effects photocopier of claim 16, said special effects generator generating an image of the outline of a character in the image of the object to be copied, and said special effect image being applied in a closely spaced apart relationship to the corresponding charater in the image.

20. A photocopier system for reproducing an image of an object with a special effect image to enable the images to be viewable in three dimenhsional form comprising:

a portable optical reader means for reading an image of an object, said portable reader means reading a different image of the same object from a different vantage position at a different location, a photosensor for receiving the image and the different image of the same object, at displaced positions on the photosensor, thereby to form first and second latent images corresponding to said image and different image, and developer means for visually developing said first and different latent images with different visually distinguishable characteristics, said portable optical reader comprising a portable electronic video camera for imaging said object from two displaced positions, and including a portable memory for recording the image and different image of the object.

21. A photocopier for reproducing an image of an object with special effects comprising:
an optical reader means for reading and reproducing an image of an object to be copied,
a photosensor exposed to the reproduction of the image to form a first latent image thereof,
a memory medium responsive to the optical reader means for storing an image from said reader means, and being coupled to said photosensor to expose said photosensor to a special effect image from said memory means,
and means for developing said first latent image and special effects latent image with different visually distinguishable characteristcs.

22. In the photocopier of claim 21,
the addition of means for modifying the image in the memory means and applying the modified image to the photosensor to form said special effects image.

23. In the photocopier of claim 21,
the addition of image recognition means for selecting portions of less than the entire image in memory and applying said portions to the photosensor to provide said special effects image.

24. In the photocopier of claim 2,
said optical reader means comprising a portable video electronic camera and said memory being portable and associated with said camera.

* * * * *